Figure 1:
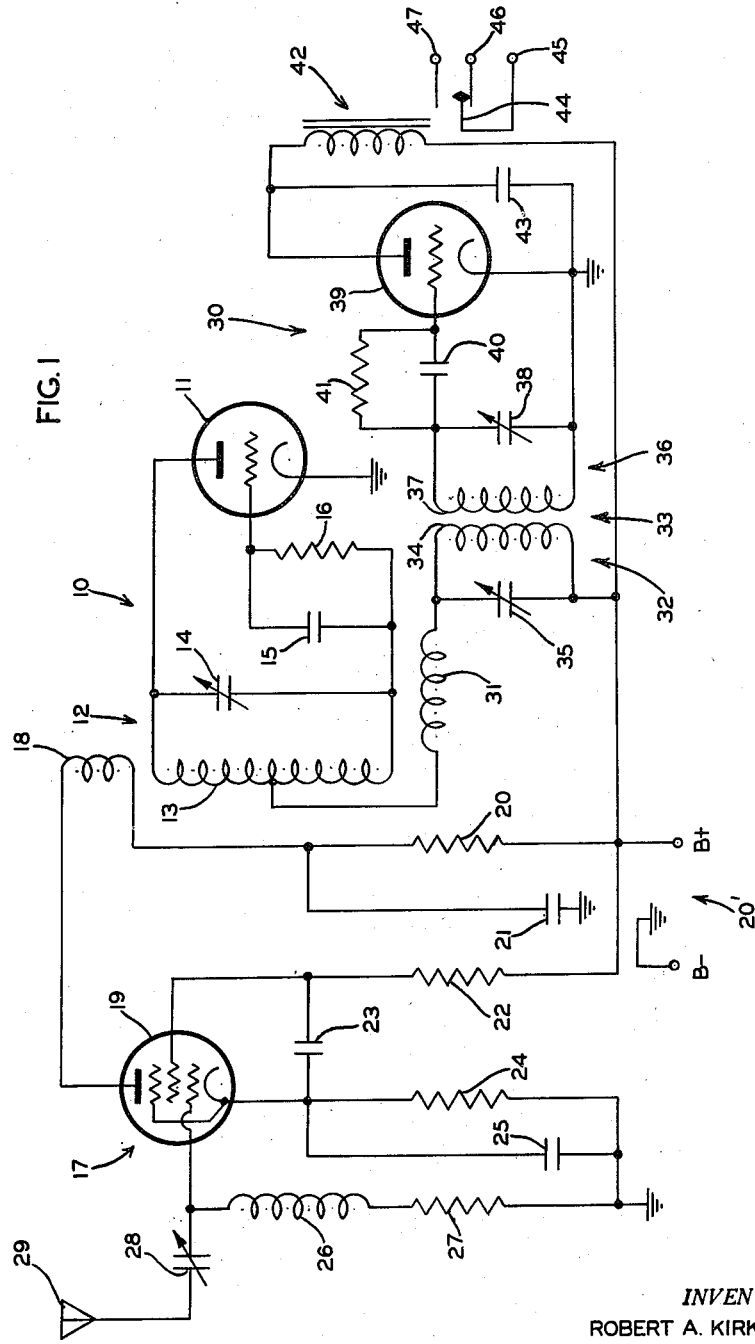

Feb. 5, 1952        R. A. KIRKMAN        2,584,132
RADIO RECEIVING SYSTEM

Filed Jan. 4, 1944        2 SHEETS—SHEET 1

INVENTOR.
ROBERT A. KIRKMAN
BY
*William D. Hall.*
Attorney

INVENTOR.
ROBERT A. KIRKMAN
BY William D. Hall.
Attorney

Patented Feb. 5, 1952

2,584,132

UNITED STATES PATENT OFFICE 2,584,132

RADIO RECEIVING SYSTEM

Robert A. Kirkman, Elberon, N. J.

Application January 4, 1944, Serial No. 516,949

11 Claims. (Cl. 250—20)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to radio control systems, and more particularly to the receiver or detector thereof for controlling the operation of meteorological recording instruments, radio-controlled mines, torpedoes, aircraft, etc.

The system of the present invention is especially suitable for detecting radio-frequency energy of very low power, such as that radiated by a transmitter of the type to be carried aloft by a balloon, and automatically keyed in accordance with the atmospheric conditions encountered during its flight.

A transmitter used for the above purpose must, unfortunately, be of very low power in order that the weight sustained by the balloon be maintained at a reasonable level, and therefore the receiver utilized for detecting the energy radiated by such transmitter must be extremely sensitive. Sometimes the receiver itself is carried aloft and therefore it, too, must be simple, light, and compact. Yet, these characteristics cannot be attained at the expense of sensitivity.

It is, therefore, the main object of the present invention to generally improve radio receiving systems whereby the sensitivity thereof is greatly increased.

It is a further object of the present invention to provide a radio receiving system of such unusual sensitivity that an extremely low powered and therefore light and compact, transmitter may be carried aloft by a meteorological balloon, resulting in the balloon reaching greater altitudes than has heretofore been possible.

These, and other objects, which will become apparent as the detailed description progresses, are attained in the present invention in the following manner:

It is well known that the quench frequency of a super-regenerative detector increases when said detector is excited by an external signal, the magnitude of the shift in frequency being a function of the signal intensity.

It is also well known that the plate current of a grid-leak detector decreases when said detector is excited by an external signal, and increases upon the cessation of said external signal.

The present invention utilizes these two phenomena by employing a super-regenerative detector, preferably self-quenching, said detector being receptive of radio-frequency signals received from a low-powered transmitter carried aloft by a balloon, or the like. In a super-regenerative detector, the received energy is regenerated to a high degree so that the circuit is at or close to the point of oscillation, whereby the energy is amplified to a high degree. By means of a separate quenching oscillator, or a circuit which causes the detector to quench itself, the oscillations in the detector are periodically interrupted at a frequency equal to the quenching frequency, which is always designed to be higher than the highest modulation frequency, i. e. the rate of quenching is always at a supermodulation rate. The frequency of the quenching or interruption current increases as the amplitude of the signal applied to the super-regenerative detector increases, particularly where a self-quenching detector is used. The quenching oscillations of said super-regenerative detector are conveyed by inductive coupling to a grid-leak detector, said inductive coupling being highly selective and being sharply tuned to the frequency of the quenching oscillations in the absence of any external, exciting signal. The plate circuit of said grid-leak detector includes an electromagnetic relay which is adapted to control any preferred electrical circuits, for example, circuits to operate instruments capable of recording meteorological data, or other instruments as above indicated.

This receiver arrangement is such that, in the absence of a signal from the transmitter, the voltage generated by the quenching oscillations of the super-regenerative detector so drives the grid-leak detector that the average plate current thereof is low, insufficient to actuate the electromagnetic relay associated therewith. However, upon the reception of a signal from the transmitter, the quench frequency of the super-regenerative detector is altered and, inasmuch as the coupling between the super-regenerative detector and the grid-leak detector is highly selective, the amplitude of the input signal to the grid-leak detector is reduced. The result is an increased average plate current, sufficient to operate the electromagnetic relay and control the electrical circuits associated therewith.

While the super-regenerative detector has been described hereinabove as being of the self-quenching type, it is to be understood that the present invention is not restricted thereto. As a matter of fact, there is described hereinafter a modification utilizing a super-regenerative detector in which the quenching oscillations are generated by a separate oscillator.

Furthermore, while a system has been described wherein the coupling between the superregenerative detector and the grid-leak detector is sharply tuned to the frequency of the quenching oscillations in the absence of an external signal, an opposed method of operation may be employed. That is, said coupling may be tuned to the frequency of the quenching oscillations in the presence of an external signal, in which case the cessation of said external signal may be utilized to operate the components which follow the super-regenerative detector.

In the following specification, taken with reference to the annexed drawings, there is described two illustrative embodiments of the radio receiving system of the present invention. It is, however, to be clearly understood that the present invention is not limited to said illustrative embodiments inasmuch as changes may be made therein without departing from the true spirit and scope of the present invention as expressed in the appended claims.

Figure 2:
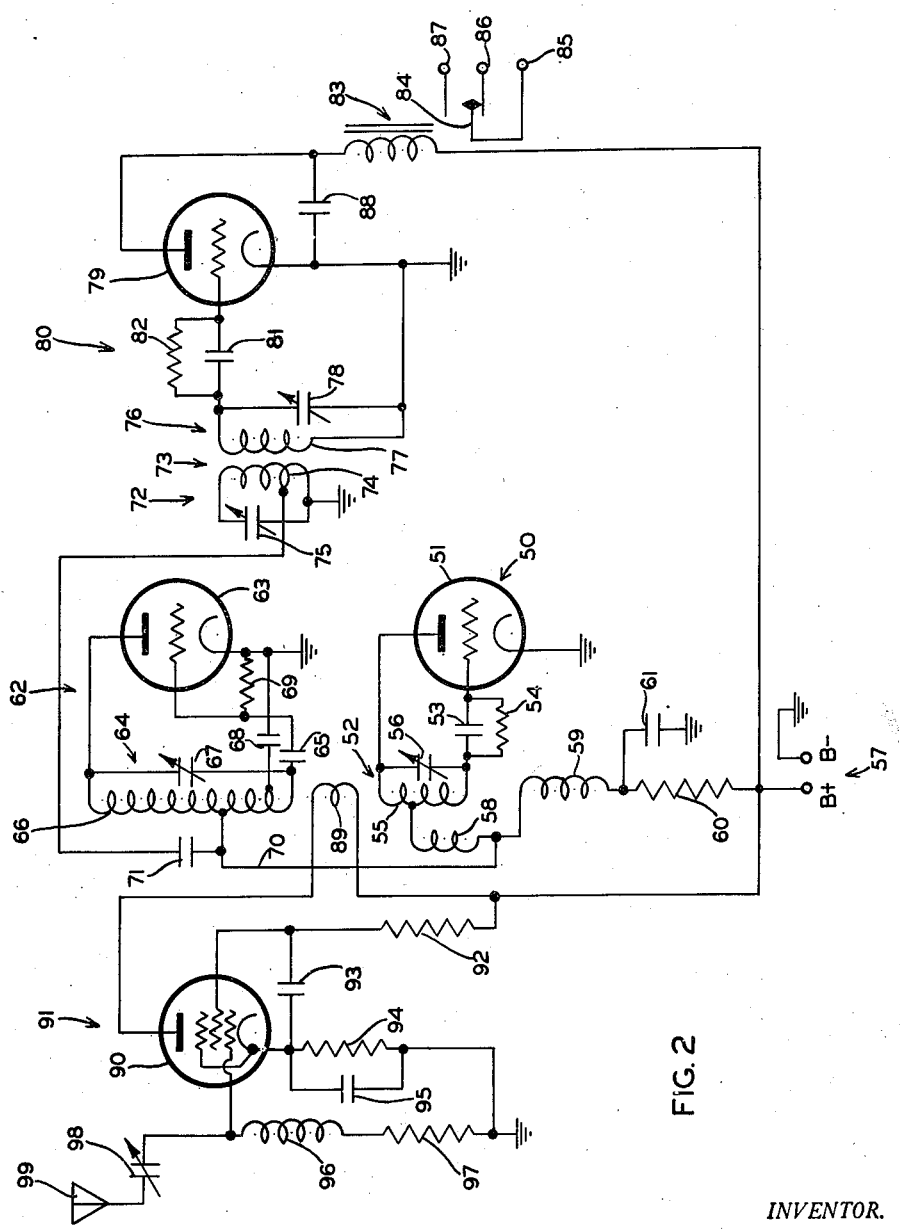

In said drawings,

Figure 1 is a schematic diagram of what is, at this time, considered a preferred embodiment of the radio receiving system of the present invention; and Figure 2 is a schematic diagram of a modified form of said radio receiving system.

Referring now more in detail to the apparatus shown in Figure 1 of the drawings, the numeral 10 generally designates a conventional self-quenching, super-regenerative detector, said detector including a vacuum tube 11 between the plate and grid of which there is connected a tank circuit 12 for tuning the same to the frequency of signals from a remote transmitter, for example, a transmitter carried into the upper atmosphere by a balloon, or the like. Said tank circuit includes an inductor 13 and shunting variable capacitor 14. The plate-grid circuit also includes a grid-blocking capacitor 15 in parallel with a grid-leak resistor 16, the values of the capacitor 15 and resistor 16 being such that the oscillations produced by the tube 11 become periodically self-quenched. The cathode is grounded.

The tank circuit 12 is receptive of the output of a radio-frequency amplifier 17 through a coupling coil 18, said coil being connected into the plate circuit of a vacuum tube 19 which also includes a de-coupling resistor 20 between the coil and the high potential side of a "B" supply 20'. The negative terminal of said "B" supply is grounded as shown. The resistor 20 is by-passed by a capacitor 21. The suppressor of the tube 19 is tied to the cathode thereof, and the screen grid is connected, through a dropping resistor 22, to the high voltage supply 20', the resistor 22 being by-passed by a capacitor 23. The cathode of said tube is connected to ground through a resistor 24, by-passed by a capacitor 25, and the control grid is receptive of the signals developed across a series connected choke 26 and resistor 27, the input circuit being completed by a variable capacitor 28 connected to an antenna 29 adapted to intercept the signals from the air-borne transmitter.

The quenching oscillations generated by the super-regenerative detector 10 are fed to a translating circuit including a sharply-tuned grid-leak detector 30, which functions as a frequency discriminator. For this purpose, said oscillations are taken from the inductor 13 by center-tapping the same, the output thus obtained being applied, through an R.-F. choke 31, to the tuned primary 32 of a coupling transformer 33, said tuned primary including an inductor 34 and shunting variable capacitor 35, the lower end of said parallel combination being connected to the "B" supply 20' to convey plate voltage to the tube 11 of the detector 10. The secondary 36 of the transformer 33 includes an inductor 37 and shunting variable capacitor 38, the parallel combination being connected between the grid and grounded cathode of a vacuum tube 39. The input to the tube 39 is applied to the control grid thereof through a grid capacitor 40 shunted by a grid-leak resistor 41. The tube 39 is a grid-leak detector which functions as an amplitude-responsive discriminating means. The plate of the tube 39 is connected to the source 20' of high voltage through an electromagnetic relay 42, which is by-passed by a capacitor 43, said relay including an armature 44 adapted to control any preferred electrical circuits terminating in a contact 45 and either of two contacts 46 or 47.

In operation, without any external signal being picked up by the antenna 29, the quenching oscillations generated by the super-regenerative detector 10 are fed, through the transformer 33, to the grid-leak detector 30. Inasmuch as the primary 32 and secondary 36 of said transformer are tuned to the frequency of said quenching oscillations, whereby the frequency response peak of the transformer is at said frequency, the amplitude of the input to the tube 39 is relatively high. As a result, the average, rectified plate current of said tube is low, and the relay 42 is deenergized. Therefore, while the circuit between the terminals 45 and 47 is open, the circuit between the terminals 45 and 46 is closed.

Upon receiving a signal from the air-borne transmitter, said signal is amplified in the R.-F. amplifier 17, and is applied to the super-regenerative detector 10 through the coupling coil 18. The application of this energy to the tuned circuit 12 of the super-regenerative detector alters the impedance of the plate-to-grid circuit of said detector whereby the frequency of the quenching oscillations generated thereby is increased. Inasmuch as the primary and secondary of the transformer 33 are tuned to the frequency of the original quenching oscillations, the input to the grid-leak detector or discriminator 30 is decreased. This results in an increased average plate current, sufficient to operate the relay 42 and thereby break the circuit between the terminals 45 and 46 and complete the circuit between the terminals 45 and 47. It will be seen that the tuned transformer constitutes a frequency discriminator of the sloping filter type, i. e., the resonance curve of the transformer has a sharply sloping frequency characteristic in the region of the varying quenching frequency so that the output amplitude of the discriminator varies sharply as said quenching frequency is varied as a result of the amplitude variations of the incoming signal.

This completes the description of what is now considered the preferred form of the receiving system of the present invention, and the modified form thereof, shown in Figure 2 of the drawings, will now be described.

As there shown, the numeral 50 generally designates an oscillating detector of the externally quenched type, said detector including a vacuum tube 51 between the plate and grid of which there is connected, in series, a tank circuit 52, and a parallel grid capacitor-resistor combination 53 and 54. The tank circuit 52 includes an inductor 55 and a parallel variable capacitor 56. The cathode of said tube is grounded, and high voltage is applied to the plate by tapping the inductor 55 and connecting the same, through a high R.-F. choke 58, a quench-frequency choke 59, and a dropping resistor 60, to the high potential side of a "B" supply 57. The negative terminal of said "B" supply is grounded, and the resistor 60 is by-passed by a capacitor 61.

For the purpose of applying quenching oscillations to the oscillating detector 50 there is provided a separate generator 62, said generator including a vacuum tube 63 between the plate and grid of which there is connected a tank circuit 64 and a grid blocking capacitor 65. The tank circuit includes an inductor 66 and shunting variable capacitor 67. The inductor 66 is tapped and connected, through a capacitor 68, to the grounded cathode of the tube, and the grid of said tube is likewise connected to said grounded cathode, through a leak resistor 69. The oscillations generated by this circuit are conveyed to the detector 50 by tapping the inductor 66 and connecting the same, through a conductor 70 and the choke 58, to the tank circuit 52. The inductor 66 is also connected, through a coupling capacitor 71, to the tuned primary 72 of a coupling transformer 73, said primary including an inductor 74 and parallel variable capacitor 75.

The tuned secondary 76 of the transformer 73, which includes an inductor 77 and parallel variable capacitor 78, is connected between the grid and grounded cathode of a vacuum tube 79, the latter constituting a part of a grid-leak detector or discriminator circuit 80. The grid-to-cathode circuit of said tube also includes a grid capacitor 81 and shunting resistor 82. The plate of said tube is connected, through an electromagnetic relay 83, to the high potential side of the "B" supply 57, said relay including an armature 84 adapted to control circuits terminating in a contact 85 and either of two contacts 86 or 87. The relay 83 is by-passed by a capacitor 88.

External signals are applied to the oscillating detector 50 through a coupling coil 89 connected in the plate circuit of a vacuum tube 90, constituting a component of a radio-frequency amplifier 91, said plate circuit being completed by connection with the high potential side of the "B" supply 57. The suppressor of the tube 90 is tied to the cathode thereof, and the screen grid is connected, through a dropping resistor 92, to the "B" supply, said resistor being by-passed by a capacitor 93. The tube 90 is biased by means of a cathode resistor 94, by-passed by a capacitor 95. The control grid is receptive of the signals developed across a series connected choke 96 and resistor 97, the input circuit to the radio-frequency amplifier being completed by a tuning capacitor 98 connected to an antenna 99.

In the absence of an external signal, the oscillations generated in the tank circuit 64 of the generator 62 are applied to the oscillating detector 50 to periodically quench the same, and are also applied to the tuned primary 72 of the coupling transformer 73. Inasmuch as the primary 72 and secondary 76 are sharply tuned to the frequency of these oscillations, as in the case of the embodiment shown in Figure 1 of the drawings, the input to the grid-leak detector 80 is of relatively high amplitude. The average, rectified plate current of said grid-leak detector is therefore relatively low, and the electromagnetic relay is not energized, so that a circuit is completed through the contacts 85 and 86.

However, upon reception of external signals, these signals are applied to the oscillating detector 50 through the coupling coil 89. This alters the impedance of the plate-to-grid circuit of the detector 50, and this altered impedance is reflected in the tank circuit 64 of the generator 62 by way of the conductor 70. The frequency of the oscillations produced by the generator 62 is thereby altered, with the result that the input applied, through the coupling transformer 73, to the grid-leak detector or discriminator 80 is reduced. The resulting increased average plate current in said detector 80 is sufficient to actuate the relay 83 to break the circuit between the contacts 85 and 86 and complete the circuit between the contacts 85 and 87.

This completes the description of the aforesaid illustrative embodiments of the radio-receiving system of the present invention, including the modes of operation thereof; and it will be noted from all of the foregoing that there has been provided a radio receiving system which is extremely sensitive, even to the low power ordinarily radiated by balloon-carried transmitters, such as are utilized for obtaining meteorological data. As indicated in earlier portions of this specification, the increased sensitivity attained by the radio receiving system of the present invention enables utilizing lighter and more compact transmitters, and the result is that the balloons which carry the same are able to attain higher altitude than has heretofore been possible. Also, because of the increased sensitivity of the receiving system of the present invention, the receiver embodying the same may itself be extremely light and compact.

Other objects and advantages of the present invention will readily occur to those skilled in the art to which the same relates.

I claim:

1. A radio receiving system comprising; a super-regenerative detector adapted to receive an external signal; a grid-leak detector; a transformer, coupling said detectors and having primary and secondary circuits sharply tuned to the frequency of the quenching oscillations generated by said super-regenerative detector in the absence of the application of said external signal, for feeding said quenching oscillations to said grid-leak detector; and an electromagnetic relay, receptive of the output of said grid-leak detector, for controlling an independent electrical circuit; the application of said external signal to said super-regenerative detector and the resulting shift in the frequency of said quenching oscillations altering the input to said grid-leak detector and thereby causing said electromagnetic relay to operate.

2. In combination, a superregenerative detector the quenching frequency of which changes over a predetermined range in accordance with changes in the amplitude of energy impressed thereon, means for impressing radio frequency currents upon said detector, a translating circuit coupled to said detector, and frequency discriminator means in said translating circuit to render it responsive predominately to the shift in the quenching frequency of said detector over said range to provide an output the amplitude of which varies with variation in said quenching frequency.

3. In combination, a superregenerative detector the quenching frequency of which changes in accordance with changes in the amplitude of energy impressed thereon, means for impressing radio frequency currents upon said detector, and a sharply tuned translating circuit coupled to the output of said detector, the frequency response peak of said translating circuit being displaced from the quenching frequency of said detector in the absence of said radio frequency currents, but nearer to said quenching frequency in the presence of said currents, and an amplitude responsive translating means coupled to said translating circuit.

4. The combination set forth in claim 3, wherein said frequency response peak is normally higher than the quenching frequency of said detector in the absence of said radio frequency currents.

5. In combination, a superregenerative detector the quenching frequency of which varies over a predetermined range with changes in the amplitude of energy impressed thereon, means for impressing radio frequency currents upon said detector, and a tuned circuit having a sloping frequency response characteristic coupled to the output of said detector and responsive to the quenching frequency output of said detector, the slope of the resonance curve of said circuit lying within said predetermined range and being sufficiently sharp to enable said circuit to respond to changes in said quenching frequency within the range of variation thereof to provide an output the amplitude of which varies with variation in said quenching frequency.

6. A method of receiving modulated carrier wave energy which comprises regenerating the energy to a high degree, interrupting the regeneration at a predetermined frequency thereby to provide interruption current, producing a change in the frequency of said interruption current in accordance with the amplitude modulation of said carrier energy, transforming the interruption current frequency variations by frequency discrimination into corresponding amplitude variations, and deriving signal voltages from the resulting amplitude variable interruption current corresponding to the modulation on the received carrier.

7. In a system for receiving modulated carrier wave energy, a regenerative amplifier tube provided with a carrier wave energy input circuit tuned substantially to a desired carrier frequency, means in the input circuit of said tube for providing self-quenching oscillations, said means including means for producing a change in the frequency of said oscillations in accordance with the modulation of said carrier wave, means coupled to the output circuit of said tube for translating frequency deviations of said oscillations into corresponding amplitude variations, and means for rectifying the amplitude variable quench oscillations so produced.

8. In a super-regenerative receiving system, means for regenerating received modulated carrier wave energy, means for interrupting the regeneration, means producing interruption currents of variable frequency which correspond to the modulation on the received carrier energy, and frequency discrimination means for producing energy having amplitude variations corresponding to the frequency variation of the interruption currents.

9. A method of receiving radio signals in a self-interrupted oscillator system, which includes applying said signals to said system, varying the frequency of interruption in accordance with the amplitude of the received signals, separating out current of the interruption frequency, and detecting the frequency variations of said separated current subsequent to separation.

10. A method of receiving radio signals in an oscillating system including application of said signals to a circuit oscillating at approximately the same frequency as the signals, interruption of the oscillations at a super-modulation rate, variation of the interruption frequency in accordance with the modulation of said radio signals, selection of currents of said interruption frequency, subjection of the selected currents to frequency discrimination to produce resulting currents the amplitude of which varies in accordance with said variation, and rectification of the resulting currents.

11. A method of receiving radio signals which includes self-quenching super-regenerative detection of said signals to produce quenching oscillations the frequency of which varies in accordance with the modulation of said signals, selection of quench-frequency oscillations, and detection of the frequency variation of said quench-frequency oscillations, said frequency variation detection including rectification of said oscillations.

ROBERT A. KIRKMAN.

REFERENCES CITED

The following references are of record in the file of this patent:

UNITED STATES PATENTS

| Number | Name | Date |
|---|---|---|
| 2,091,546 | Hruska | Aug. 31, 1937 |
| 2,156,809 | Friederickson | May 2, 1939 |
| 2,171,148 | Percival | Aug. 29, 1939 |
| 2,337,392 | Hunt | Dec. 21, 1943 |
| 2,351,221 | Mountjoy | June 13, 1944 |
| 2,410,981 | Kich | Nov. 12, 1946 |

FOREIGN PATENTS

| Number | Country | Date |
|---|---|---|
| 401,791 | Great Britain | Nov. 23, 1933 |
| 418,525 | Great Britain | Oct. 26, 1934 |